June 9, 1936.  R. L. CARR  2,043,652
VEHICLE BODY
Filed Feb. 3, 1933   6 Sheets-Sheet 1

Inventor
Raymond L. Carr

June 9, 1936.  R. L. CARR  2,043,652
VEHICLE BODY
Filed Feb. 3, 1933  6 Sheets-Sheet 3

Inventor
Raymond L. Carr

Patented June 9, 1936

2,043,652

UNITED STATES PATENT OFFICE 2,043,652

VEHICLE BODY

Raymond L. Carr, Boston, Mass.

Application February 3, 1933, Serial No. 654,995

17 Claims. (Cl. 296—44)

This invention relates to an improved vehicle body, and more particularly to a body of the general type described and claimed in my prior Patent No. 1,826,922, which has panels moving upwardly out of pockets in adjoining wall sections into direct juxtaposition to provide a continuous closure wall without necessity of intervening posts, expansible or sectional panels, or the like.

In general, the present invention affords structure associated with the panels to assure their proper and accurate positioning under all working conditions as, for example, when either panel is in raised, lowered or an intermediate position, with the door either opened or closed. Thus the present invention affords novel lifting and guiding means effective accurately to position the panels and determine the paths which they may follow under all conditions, as well as a door hinge arrangement which, upon closing of the door, cooperates with the lifting and guiding means in permitting the proper engagement of the panel edges with little or no shock.

To permit these desirable results, I preferably provide lifting and guiding means effective not only to assure the proper positioning of the panels longitudinally in relation to the corresponding body wall section, but also to maintain the paths of the ends of the panels in close parallelism to each other. In other words, endwise tilting of the panels is avoided. The improved lifting and guiding arrangement is particularly advantageous when a portion of the body wall section is broken away to permit engagement of the panel edges. Thus, the novel guiding and lifting means may be advantageously employed either with slots extending downwardly from the body rails a fraction of the height of the panels or with slots which extend downwardly for the full height of the panels. In either case, the improved lifting and guiding means preferably is arranged to afford a transverse brace or strut extending between portions of the body wall at opposite sides of a slot or broken away portion, thus affording a reenforcement which is particularly effective and particularly desirable when the corresponding panel is raised. Preferably this transverse brace moves up with and supports the corresponding panel, and this brace as well as a suitable bracket or the like at the opposite end of the panel may engage vertically disposed screw-threaded rods or worms which are rotatable to cause lifting and lowering of the corresponding panel. Since vertically disposed worms are located at opposite ends of a panel, its accurate positioning is assured and fore and aft tilting is avoided.

The sturdy and accurate supporting arrangement for the panels assures the proper positioning of their edges and facilitates the operation of the novel hinge arrangement which is a further aspect of the present invention. This hinge arrangement may be employed, although the transverse positioning of the panel edges in relation to the body wall is not accurately determined. Thus, for example, the panels may be carried upon resilient means having some transverse yieldability.

The hinge arrangement not only assures the proper reengagement of the panel edges without necessity for the employment of special trip mechanisms or the like, but it also permits such reengagement to occur with little or no shock between the panel edges, even when the door is slammed. Accordingly this invention is particularly advantageous in permitting the employment of panels having juxtaposed transparent edges of glass or the like in direct overlapping engagement, and in permitting the door to be shut so that the panel edges are reengaged without necessity for employing trip mechanism of the character described in my Patent No. 1,826,865. To permit these desirable results, the hinges supporting the swinging door preferably are arranged so that the hinge axis is in close juxtaposition to the paths of panel edges and slightly spaced longitudinally of the vehicle from these paths. Preferably the hinge axis is arranged so that it inclines upwardly and inwardly in a transverse direction in relation to the paths of the juxtaposed panel edges, and in many cases it is desirable to have the axis intersect the paths of these edges and, in certain cases, to be spaced inwardly from the upper edges of these portions of the panels. Obviously this arrangement causes the lower portion of the hinge axis to be spaced farther from the normal path of the panel edges than the portion thereof that intersects the body rail.

This arrangement permits the hinge axis to be disposed close to the normal paths of the panel edges at the height of the door rail so that the upper corners of the panels when lowered need not be spaced materially from each other when the door is open; furthermore, this arrangement leaves more room adjoining the lower part of the door for suitable hinge structure. Above the door rail the axis is positioned so that the panel edges, when the panels are fully raised, may remain in wiping contact, i. e., be held in yieldable engagement.

For this purpose, as well as normally to hold the panel edges in engagement with each other, resilient supporting means of the general character described in my Patents Nos. 1,826,865 and 1,876,855, and applications Serial Nos. 562,613; 565,002 and 565,003 may be employed. Supporting means of this character is effective in cooperating with the hinge arrangement in acting as an automatic take-up as the hinge means wears or becomes loose; furthermore, the resilient supports yieldably press the panel edges together under certain conditions when the door is opened. Furthermore, the resilient supporting means in conjunction with the beveled panel edges permits proper reengagement of the edges despite body weaving, twisting or the like.

The above and further objects and advantageous features of the invention will be apparent to those skilled in the art upon a reading of the subjoined description and claims in conjunction with the accompanying drawings, in which:

Figures 1, 2:
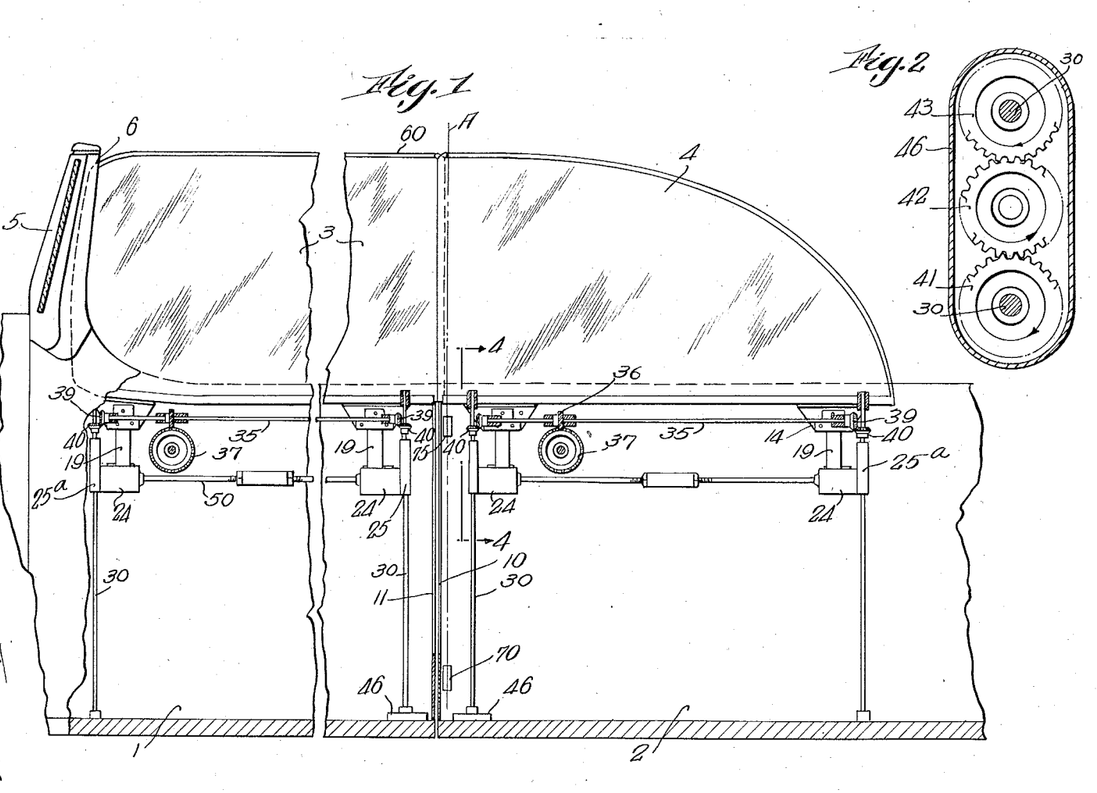
Fig. 1 is a broken side view of a portion of a body wall and associated structure, including juxtaposed closure panels, the inner portion of the wall being broken away to show the supporting and guiding means for the panels.
Fig. 2 is a horizontal section of a portion of the gearing associated with the lifting and guiding means.

First referring more particularly to Fig. 1, numeral 1 indicates the swinging door which has its rear end hinged to a fixed body wall section 2. A closure panel 3 is carried by the body wall section 2. The front portion of the panel 3 may slide in a channeled upright 6 upon the door, which engages the windshield standard assembly 5. Preferably the panels 3 and 4, when raised, have beveled transparent edge portions maintained in contact. Any suitable arrangement may be provided thus to assure the contacting engagement of the panels when raised.

Figure 9:
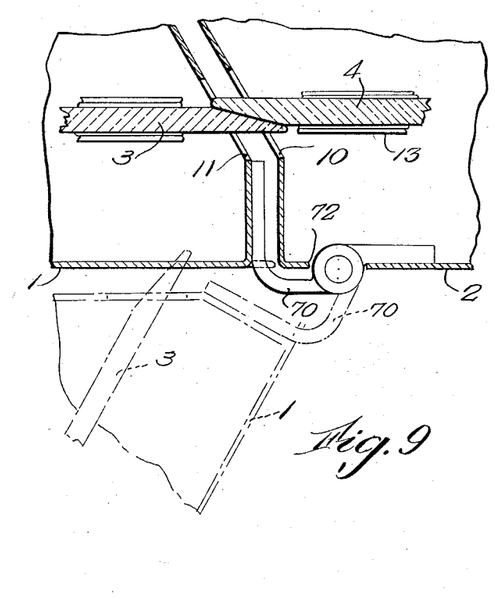
Figs. 9 and 10 are broken horizontal sectional views of portions of the door and adjoining body wall section, showing the lower and upper hinges respectively.
Figures 11, 12, 13, 14, 15, 16, 17:
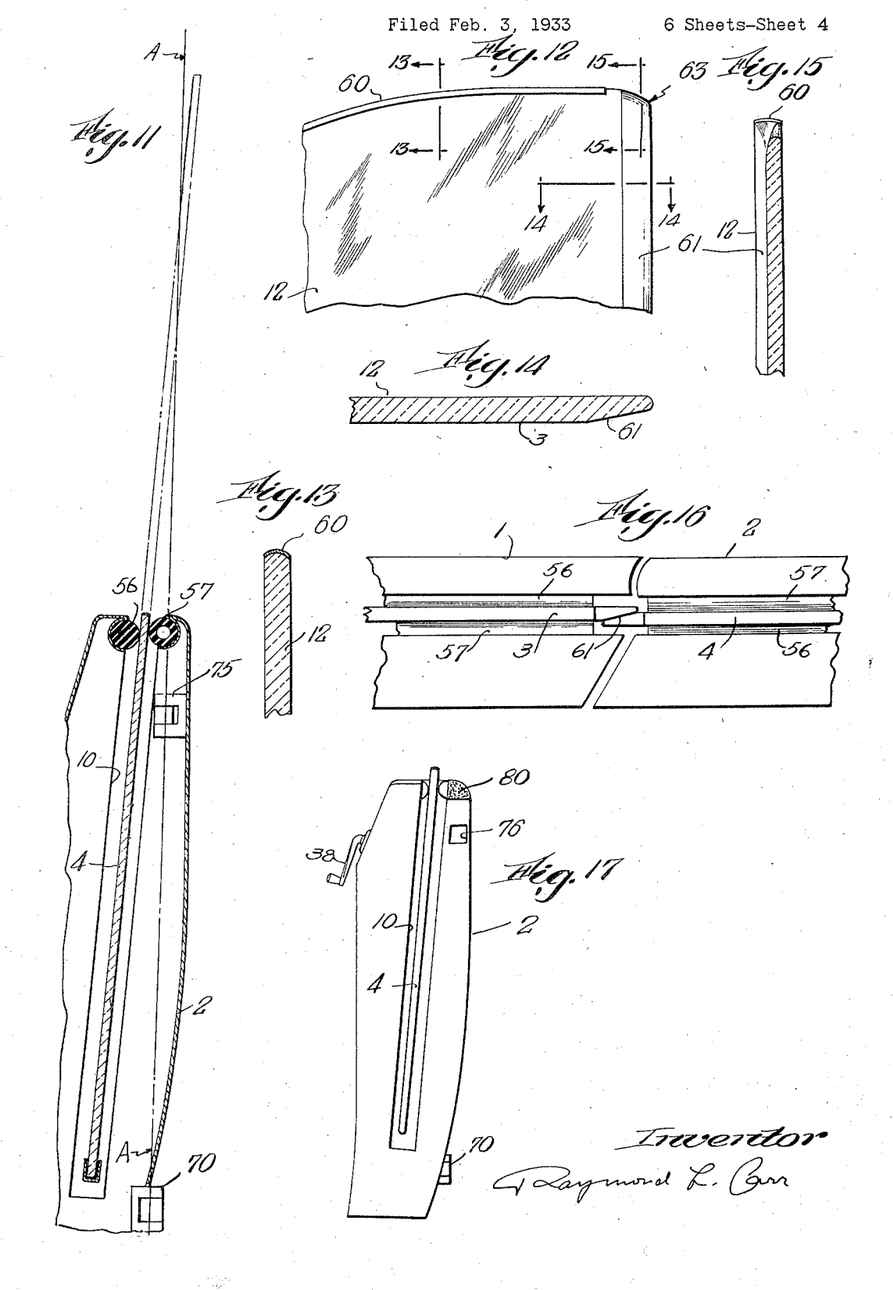
Fig. 11 is a vertical section of the rear wall section, showing the position of the hinge axis in relation to the path of the rear panel.
Fig. 12 is a side elevation of the rear portion of the front panel.
Figs. 13, 14 and 15 are sections on lines 13—13, 14—14 and 15—15 of Fig. 12.
Fig. 16 is a top view of the body wall in the region of the door hinge.
Fig. 17 is an end elevation of the rear section of the body wall.

As shown, the rear end of the door and the front end of the adjoining body wall section may have end walls provided with deep slots. Thus, as shown in Fig. 17, the end wall of the section 2 is provided with a slot 10 and a similar slot 11 is provided in the rear wall of the door (Fig. 9). Accordingly the beveled edges of the panels may slide in contact with each other throughout their paths, and one of the panels, when lowered, may have an upper corner engaging the lower corner of the adjoining panel when the latter is raised. Slots of this character tend materially to weaken the body wall. Although special reinforcing means may be provided to brace the body wall about each side of each slot, such arrangements are likely to necessitate rather awkward and cumbersome structures, and even then there is a considerable tendency for the inner and outer portions of the body wall to move relative to each other and particularly to spread when pressure is put upon the upper portion of a raised panel. Under such conditions the raised panel tends to act as a lever effective to spread the upper portions of the door or body wall section apart.

Figures 3, 4, 5, 6, 7:
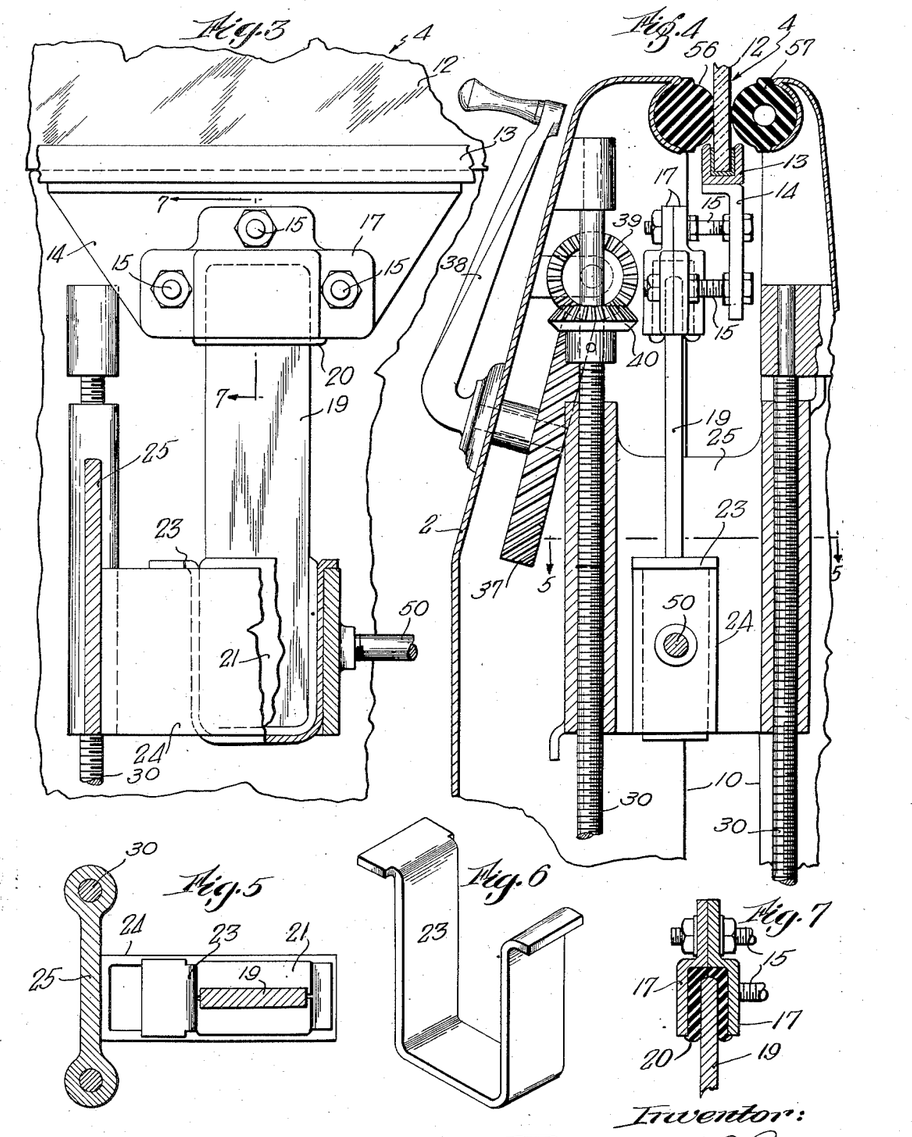
Fig. 3 is a detail view, with parts broken away and shown in section, showing a portion of the supporting and lifting means for a closure panel.
Fig. 4 is a section on line 4—4 of Fig. 1.
Fig. 5 is a section on the line 5—5 of Fig. 4.
Fig. 6 is an isometric detail of a holding element for one of the supporting springs.
Fig. 7 is a section on line 7—7 of Fig. 3.
Figure 21:
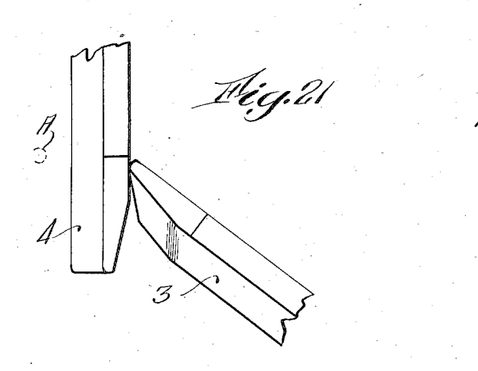
Fig. 21 is a similar view but showing the panels when fully raised.

As shown in the accompanying drawings, each of the panels may be provided with a glass body portion 12 supported in a channel frame 13 which is secured by welding or the like to supporting angles 14 (Figs. 3 and 21). A plurality of adjusting bolts 15 connect each member 14 with ears upon the inverted pocket elements 17 which cooperate in providing a pocket receiving the upper end of a vertically disposed leaf spring 19. Preferably a cushion 20 of rubber or the like (Fig. 7) may be disposed about the end of the spring and between the same and the walls of the pocket thus provided. The lower end of the spring is similarly provided with a cushion 21 which is received in a pocket element 23 of generally U-shape that is retained within a rectangular member or metal box 24. The sides of the box-like member 24 cooperate with the member 23 in affording a pocket or recess in which the lower end of the spring 19 is received. The end of member 24 may be welded to a transverse brace 25, which forms part of the lifting and guiding means. The extremities of this brace preferably are in the form of cylindrical enlargements which afford internally threaded, vertical openings through which the worms 30 extend. Adjoining each slot 10 or 11, there preferably is a pair of these worms 30 connected by a brace 25 of the type indicated, while at the ends of each body wall section remote from the slot a single worm may engage a bracket 25a, as shown, for example, in Fig. 8.

Suitable driving means is afforded to cause the rotation of the worms in each of the sections in unison. Thus, referring particularly to Figs. 1, 4 and 8, a horizontal shaft 35 may be disposed in the upper part of the body wall and may support a helical gear 36 meshing with a larger helical gear 37 that is carried upon an inclined axial support extending through the inner wall of the door and carrying a hand crank 38. The ends of the shaft 35 preferably carry small beveled gears 39 which mesh with similar gears 40 upon the upper ends of worms 30. Thus, for example, referring to the three worms 30 shown in the wall section 2 (Fig. 8), the shaft 35, being rotated by crank 38 and gear 37, is directly effective in causing the rotation of the worm 30 at the rear of the section and the worm 30 at its inner front corner. Suitable gearing is also provided to cause the rotation of the worm 30 at the outer front corner of section 2. Such gearing is shown particularly in Figs. 2 and 8, wherein it is evident that gear 41 may be disposed upon the lower end of a worm 30 upon the inner side of the wall, this gear meshing with an idler 42, and the latter meshing in turn with a spur gear 43 that is carried upon the worm 30 at the outer side of the wall. A suitable sheet metal casing 46 may be provided to enclose these gears (Figs. 1 and 2).

It is of course obvious that two worms may be provided at the front of the door, if desired, as well as its slotted end. Ordinarily, however, I prefer to employ three worms in the manner indicated, thus affording a three-point support for the panel and providing means positively to oppose any tendency of the panel to rotate in response to the rotation of either of the worms.

Figure 8:
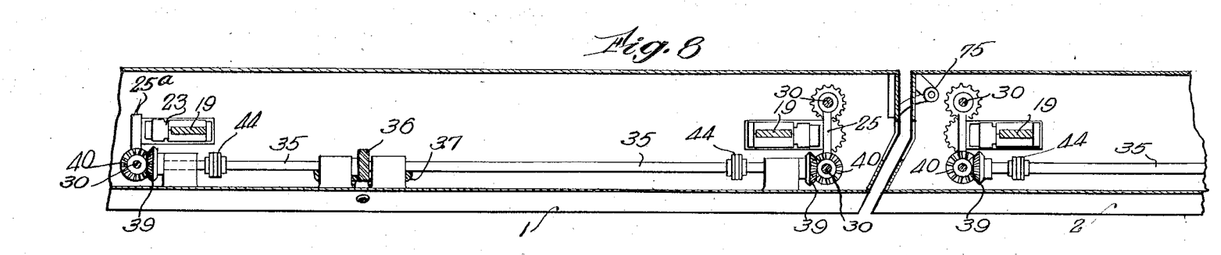
Fig. 8 is a horizontal section through the upper part of the body wall, certain parts being removed for clarity of illustration, this view also showing an optional shaft arrangement in the lifting mechanism.

As shown in Fig. 8, the shaft 35 may be provided with yieldable joints 44, thus to avoid any possibility of binding of the gears under extreme conditions of body twisting or weaving. Such joints may comprise flanges upon the shaft sections secured to a suitable yieldable disk of rubber or the like. In order to afford additional bracing, I may connect the elements 24 by an expansible-contractible brace rod 50. It is evident that the springs 19 and the pads 20 and 21 cooperate in affording transversely stressed means tending to press the beveled panel edges against each other. The yieldability of the pads 20 and 21 may be depended upon materially to aid the springs 19 in pressing the panels transversely against each other. In fact, if desired, a rigid bar may be substituted for the spring 19 and pads of the general type of the pads 20 and 21 may be employed to press the panel edges together. The adjusting bolts 15 and the nuts associated with the same are arranged so that the relative position of a bracket 14 and the corresponding spring 19 may be varied. Accordingly a greater or less stress may be impressed upon the spring, as desired, and the angular relationship of the panel in relation to the normal plane of the spring may also be varied. Thus simple means is afforded permitting ready adjustment of the panel in relation to its resilient supports.

In addition to the springs 19 and associated parts, I preferably afford rubber elements 56 and 57 (Figs. 4 and 16) disposed in recesses at either side of the slot in the upper portion of the body wall, i. e., in the body rail, through which the glass 12 of a panel slides. Preferably both of the elements 56 and 57 are formed of rubber, the element 57 being tubular and the element 56 solid. The element 56 is disposed upon the side of the panel opposite its face which is being pressed in overlapping engagement with the adjoining panel. Thus the door panel overlaps the rear panel and the solid element 56 is disposed outside of the door panel and the hollow element 57 inside of the same. Preferably the elements 56 and 57 are provided with longitudinally extending ribs adapted positively to prevent the glass 12 from engaging the edges of the slots 10 and 11 or the edges of the slots in the body rail.

Figs. 12, 13, 14 and 15 show the general arrangement of a panel edge, and particularly the upper corner thereof. As shown in Figs. 12 and 13, the upper margin of a panel may be provided with a transversely curved sheet metal moulding 60 which may be secured by any suitable adhesive to the margin of the glass. The vertical edge of the glass may be provided with a gradually beveled surface 61 which is adapted to overlap a similar oppositely beveled surface of the adjoining panel. As shown in Fig. 12, the upper corner of the beveled end portion of the panel may be slightly curved, as designated by numeral 63, thus to avoid the provision of a sharp right angled corner. Furthermore, the inner surface of this corner portion may be rounded off or given a smooth "ball-like" or "stream-line" form, thus avoiding a sharp or right angled corner upon the beveled inner surface of the upper portion of the panel. Such an arrangement may be employed for the upper corners of the juxtaposed portions of both panels 3 and 4.

The door 1 is supported on hinges 70 and 75 which are specially located in relation to the panel edges in such a manner that proper engagement of these edges is assured without necessity for employing special trip mechanism or the like and so that undue shock is also avoided. For this purpose the hinges 70 and 75 are arranged, as shown in Figs. 1 and 11, to define a hinge axis A that inclines inwardly in relation to the path of the panel 3, and preferably intersects the plane of this panel as extended when the panel is raised. The axis A is also spaced slightly to the rear of the rear edge of panel 3, as shown in Fig. 1, and may lie in a plane parallel to this edge. Fig. 9 shows the position of the lower hinge 70 when the door is closed and fully open, and also the position of the panel 3 under both of these conditions.

It is evident that the hinge 70 may be provided with a leaf extending to the rear wall of the door and having its shank disposed outwardly of the front outer corner of the section 2. As shown, the axis A may be so disposed that this hinge is substantially intersected by the plane of the outer face of the rear section and the wall of the section may be cut away to accommodate the hinge, as designated by numeral 72.

Figure 10:
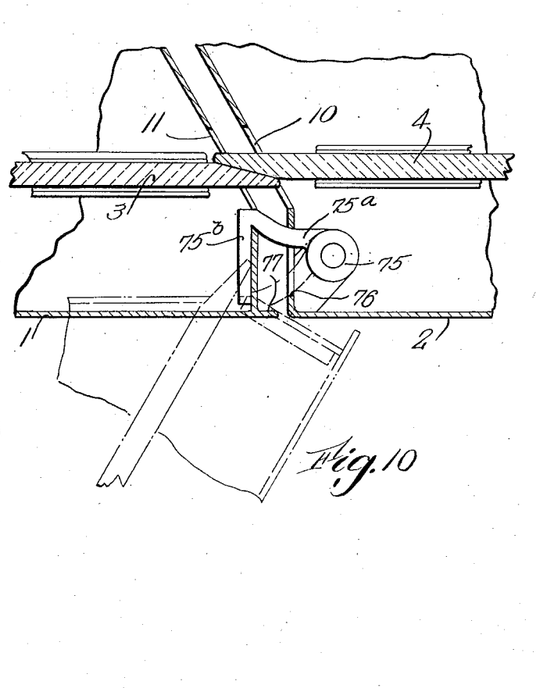

Fig. 10 illustrates the arrangement of the upper hinge 75 and the shape of the adjoining portions of the door and body wall section. The hinge 75 may comprise a leaf 75$^a$ extending forwardly through an opening 76 in the section 2 and having an out-turned extremity 75$^b$ welded to the rear wall of the door 1. This portion of the door 1 may be provided with a rearwardly extending lip 77, and when the door swings to its fully open position, as shown in dotted lines in Fig. 10, this lip swings into juxtaposition to the outer face of rear section 2. At the top of the body wall, i. e., at the body rail, the outer portions of the body wall sections may be provided with complementarily curved end portions, as shown in Fig. 16, the curvature of these portions being substantially concentric in relation to the point of intersection of the axis A with the top of the body wall.

A rubber pad 80 (Figs. 17 and 18) may be provided on the upper outer corner of the front wall of the rear body wall section to make a cushion engageable with the upper corner of the panel 3 should that panel accidentally be pressed outwardly and rearwardly so that its corner might engage this portion of the body wall when the door is in its opened position.

Figure 18:
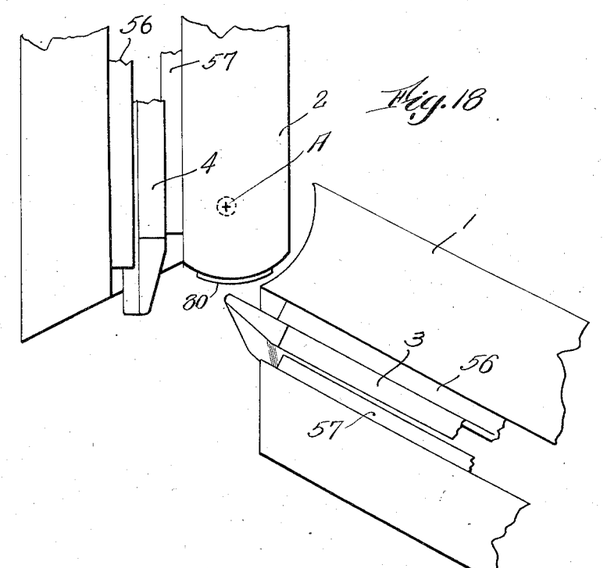
Figs. 18 and 19 are views at the top of the body wall, showing the manner in which the panels are positioned in relation to each other when the door is fully open, and approaching its closed position, respectively.
Figure 19:
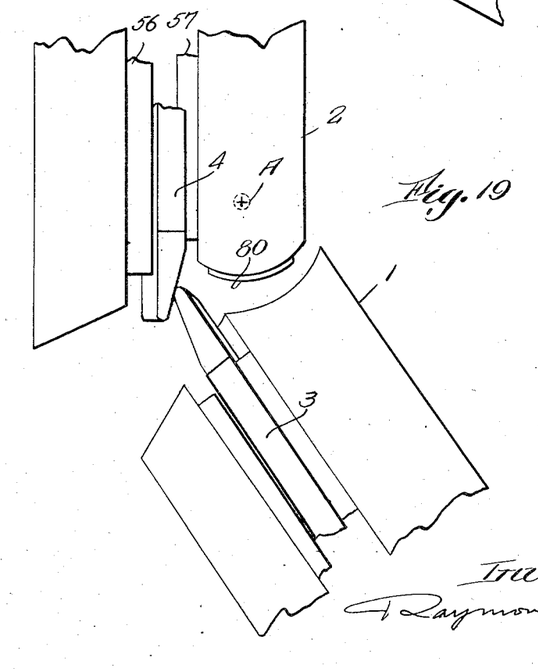

Fig. 18 shows the relative position of the panels 3 and 4 when the door 1 is swung to its fully opened position and the panels are both fully lowered. Due to the positioning of the axis A, the rear edge of panel 3 inclines upwardly and inwardly and also somewhat rearwardly. Due to the relief of stress upon the resilient supporting means, the panel 4 tends to move outwardly, and particularly the upper portion thereof. When the door is swung from the position shown in Fig. 18 toward its closed position, the upper corner of panel 3, which is rounded, as previously described, meets the beveled edge of panel 4 in substantially the position shown in Fig. 19. At this instant this corner of panel 3 is moving about the axis A in a direction at acute angles to the planes of both panels. Thus the force imposed upon the corner of the glass at the instant of contact is substantially in the general direction of the plane of the panel. Furthermore, it is of course evident that the first contact is light, since the resilient supporting means for the panels are substantially unstressed when the door is opened. As the door closes the direction of movement of the corner of panel 3 approaches more closely to the direction of extent of the plane of panel 4 and the resilient means are compressed so that the panel edges are more firmly pressed in engagement. During this movement of the parts the upper corners of the panels are first engaged and then their remaining marginal portions come into mutual engagement. This arrangement avoids any sharp blow to the meeting panel edges. The speed of relative movement of these edges may be very low due to the close spacing of the same when the door is open. Thus although the outer end of the door moves at high speed when the door is slammed, its inner edge, and particularly the edge of the panel carried by the same, moves slowly. Furthermore, the panels are not rigidly carried upon the door, but are yieldably brought into engagement, and the direction of re-engagement is such that the stresses are low and the panels tend to press against each other with a cam-like action rather than a straight abutting movement, i. e., the panels slide on each other before reaching the position which they occupy when the door is fully closed.

Figure 23:
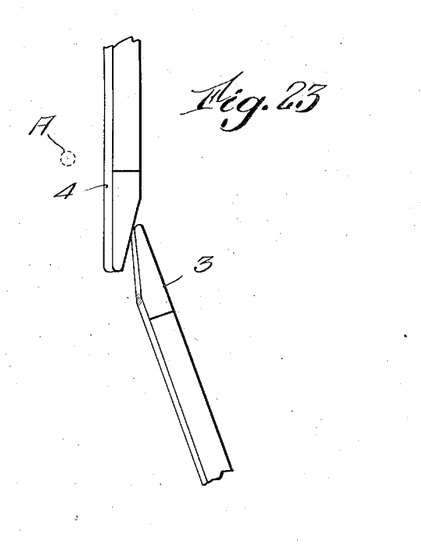
Fig. 23 is a view to Fig. 21, but showing the relative positions of the panels, when the door is nearly closed.

Fig. 21 shows the position of the upper edges of the panels when they are fully raised and the door is opened. In this position of the parts the axis A is spaced inwardly of the inner surface of the rear panel 4, as shown. Accordingly the panels move over each other with a wiping movement. As shown, the panel 3 has its rounded corner portion engaging the surface of panel 4 slightly to the rear of its beveled edge. Due to the position of the axis A the resilient means supporting the panels are slightly stressed, even when the doors are opened, i. e., the panels are lightly but yieldably pressed against each other. As the door is moved toward its closed position, the upper corner of panel 3 remains in engagement with the outer surface of panel 4 but slides forward relative to the same, reaching, for example, the position shown in Fig. 23. Thus a wiping contact of the panel corners is assured as the door is being closed and the pressure with which the panel edges are pressed in engagement increases only gradually, even if the door is slammed. Thus there is no sharp shock tending to break or chip the glass of the panel.

Figure 20:
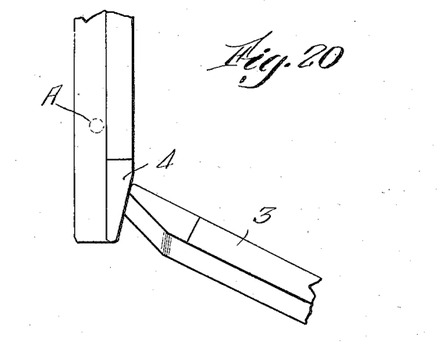
Fig. 20 is a top view of the panels substantially one-half raised, showing their relative position when the door is open.
Figure 22:
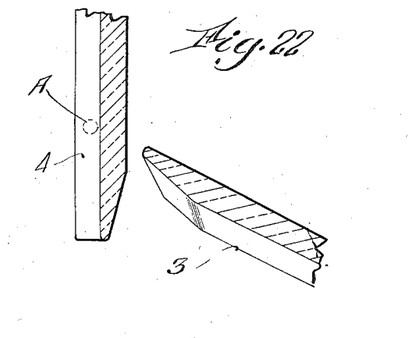
Fig. 22 is a horizontal section showing the position of the fully raised panels when the door is open.

Fig. 20 shows the relative positions of the upper edges of the panels when they are both about half raised and the door is fully opened. Under such conditions the rear corner of the door panel 3 may contact with or be in close juxtaposition to the face of the rear panel 4. Thus as the door closes there is a relative wiping action between the panels of the same general type as described with reference to Figs. 21 and 23, but of a less pronounced character. Fig. 22 illustrates the position of the panel edges substantially midway of their heights when the panels are fully raised and the door is opened, i. e., when the panels are occupying the same general position as illustrated in Fig. 21.

Figs. 18 and 21 obviously illustrate the extreme relative positions of the panels when the door is opened. Thus Fig. 18 shows the panels in the position in which they are most widely spaced with the door fully opened, and Fig. 21 illustrates the position wherein they are most firmly pressed together with the door fully opened. Obviously the panels may occupy various intermediate positions, depending upon whether one or both is wholly or partially raised.

In practice it may be understood that the spacing of the axis A from the outer plane of the panel 3, extended, may be substantially one and one-half inches at the bottom of the panel, i. e., just above the hinge 70, and that it may be of the order of one-half inch at the top of the body wall. The inclined arrangement of the hinge axis permits adequate room to be afforded for the hinge structure below the door rail while permitting the panel edges to be disposed close to the line of the axis at the rail or thereabove, as shown most clearly in Fig. 11. Accordingly, even under extreme conditions the panel edges are but slightly spaced when the door is fully opened (Fig. 18), while as the panels approach their fully raised position, they may not be spaced at all, even when the door is opened. With this arrangement one panel may have its upper corner move into contact with the other panel or remain in contact therewith when the door is swung toward its closed position. The upper portion of a panel may occupy a position between that adjoining the upper edge of the body wall, shown in full lines in Fig. 11, for example, and that shown in dotted lines in Fig. 11. Obviously the upper portion of the panel therefor follows a path which is closely juxtaposed and, in fact, may be intersected by the line of the hinge axis. When the panels are fully raised, the axis A preferably is spaced from the adjoining panel at an average distance which is of the order of or less than twice the thickness of the glass itself.

It is evident that this hinge arrangement permits the panels either to remain in contact while the door is open or to remain in closely spaced relationship. Under the latter condition, the corner of one panel first engages the other panel when the panels again meet. The arrangement of the hinge axis is such that the corner portion of one panel may be spaced from the other panel at the greatest distance when the first panel is lowered. Under such conditions the positioning means in the door, including the elements 56 and 57, are effective in opposing any substantial variation in the positioning of the panel so that it is not necessary to allow an especially wide tolerance for variation in panel positioning in order to assure the proper meeting of the panel edges.

However, when the panels are fully raised their upper corners may not be accurately positioned in relation to the corresponding body wall sections, i. e., there may be a considerable inclination of the panel in one direction or the other due to the stressing of the resilient elements 19, 56, 57, etc. Under these conditions it is desirable to have the hinge axis arranged as shown so that a wiping effect ordinarily takes place and so that normally the panel edges remain in contact when the door is opened, the retaining springs being slightly stressed under such conditions. Thus, even if one of the panels happens to be considerably displaced from its normal position, the meeting of the panels without undue shock is permitted.

It is evident that the resilient means, namely the springs 19 and cooperating parts which tend to hold the panel edges together when the door is closed, also have an additional function with the present hinge arrangement, since they afford a resilient take-up in case of looseness or wear of the door hinges. For example, referring to Fig. 21, if the upper hinge should wear so that the inner edge of the door 1 is spaced outwardly somewhat further than is normal, the resilient means supporting the panels 3 and 4 would merely tend to tip them toward each other to a somewhat greater extent so their upper corners would still have the same general relationship to each other as under the normal conditions illustrated in Fig. 21.

The arrangement of the adjustable supporting means for the panels is advantageous, and particularly the employment of the rubber cushioning elements 20 and 21, these elements cooperating in pressing the panel edges together and affording dampening means to oppose periodic vibrations.

The arrangement of the lifting and guiding means is particularly important with a hinge arrangement of the character shown, since it assures the maintenance of the edges of the panels in proper position and avoids endwise tilting, assuring the uniform, positive upward and downward movement of all parts of the panel and avoiding any possibility of catching of the panel due to tilting or the like. Furthermore, the member 25 affords a relatively strong brace spanning the slot at the end of the body wall section and affording means opposing, not only movement of the opposite portions of the section toward each other, but opposing any tendency toward a spreading movement which may be caused by pressure upon the upper edge of a raised panel.

In incorporating the principles of this invention in a vehicle body, I prefer to combine the lifting and guiding means by providing means such as the worms 30. However, these functions may be afforded by separate elements without departing from the spirit of this invention. The guiding means is, of course, afforded by the circumferential surfaces of the worms in engagement with the complementarily formed portions of the brackets 25, while the lifting means is afforded by the helically inclined surfaces of the worms and the corresponding portions of the engaging brackets. Thus, in practice, upstanding non-threaded elements might be employed in place of the worms 30 to engage vertical openings in suitable brackets and other lifting means might be provided. However, I deem it advantageous to combine the lifting and guiding mechanisms in the manner disclosed.

It is evident that the improved hinge arrangement afforded by this invention is advantageous in permitting panels having glass edges to be employed upon a swinging door and an adjoining section without the necessity of employing special trip mechanism to protect the panel edges and that the arrangement of the hinge means to provide an axis intersecting or closely spaced from the normal positions of the edges of the raised panels is particularly advantageous when the panels are supported without engaging intermediate door posts or the like and when resilient means are depended upon normally to press the panel edges together, and when such means is effective in permitting a certain amount of transverse movement of the panels, especially when the door is open.

I claim:

1. Vehicle body comprising a body wall including a door section and an adjoining section, a pair of panels above the respective sections and disposed in direct juxtaposition to form a closure wall above the body wall, hinge means between the sections to define an axis about which the door section swings, said means being arranged so that the axis inclines inwardly to intersect one of said panels when the latter are raised and the door is closed.

2. Vehicle body comprising a body wall including a door section and an adjoining section, a pair of panels slidable out of the respective sections into direct juxtaposition to form a closure wall above the body wall, said panels when raised providing unframed transparent edges in overlapping juxtaposition, supporting means for said panels yieldably urging their edges toward each other, lifting and guiding means for said panels, hinge means between the sections to define an axis about which the door section swings, said axis inclining inwardly to intersect one of said panels when the latter are raised.

3. Vehicle body comprising a body wall including a door section and an adjoining section, a pair of panels above the respective sections, said panels providing unframed transparent edges in overlapping juxtaposition, hinge means between the sections to define an axis about which the door section swings, the axis being juxtaposed to the edges of the panels at an average distance of the order of twice the panel thickness or less.

4. Vehicle body comprising a body wall including a door section and an adjoining section, a pair of panels slidable out of the respective sections into direct juxtaposition to form a closure wall above the body wall, said panels when raised providing unframed transparent edges in overlapping juxtaposition, supporting means for said panels yieldably urging their edges toward each other, lifting and guiding means for said panels, hinge means between the sections to define an axis about which the door section swings, said axis being spaced longitudinally of the vehicle beyond the edge of one panel and inclining inwardly toward the upper edge of the adjoining panel when the latter is raised.

5. Vehicle body comprising a body wall including a door and an adjoining body wall section, a panel slidable out of the door, a second panel slidable out of the adjoining section, said panels being movable into a position above the body wall wherein they have their edges in direct juxtaposition to form a closure wall, lifting and guiding means associated with said panels and the wall, hinge means between the door and the adjoining section defining a hinge axis spaced beyond the end of the door and inclined upwardly and inwardly in relation to the general plane of movement of the juxtaposed panel edges, so that the hinge axis is disposed in closely spaced relation to the plane of the outer face of the outer panel adjoining the top of the body wall and so that it substantially intersects the plane of at least one of said panels when the panels are in their fully raised positions, whereby the upper corners of the panels when lowered may meet each other after relative movement through a relatively short path and when raised may remain substantially in contact with each other even when the door is fully opened.

6. Vehicle body comprising a body wall including a door section and an adjoining section, a pair of panels carried by the respective sections and having transparent edges in direct juxtaposition, hinge means connecting said sections and arranged so that the edge of one panel presses against and wipes over the outer surface of the other panel when the door is moved between its open and closed position, and yieldable means associated with the lower edge of one of the panels to permit slight relative movement between the same and the corresponding section.

7. Vehicle body comprising a body wall including a door and an adjoining body wall section, a panel slidable out of the door, a second panel slidable out of the adjoining section, said panels being movable into a position above the body wall wherein they have their edges in direct juxtaposition to form a closure wall, lifting and guiding means associated with said panels and the wall, hinge means between the door and the adjoining section defining a hinge axis spaced beyond the end of the door and inclined upwardly and inwardly in relation to the general plane of movement of the juxtaposed panel edges so that the hinge axis is disposed in closely spaced relation to the plane of the outer face of the outer panel adjoining the top of the body wall and so that it substantially intersects the planes of both of said panels when the panels are in their fully raised positions, whereby the upper corners of the panels when lowered may meet each other after relative movement through a relatively short path and when raised may remain substantially in contact with each other even when the door is fully opened, and resilient means supporting the panels and pressing them transversely toward each other, said resilient means also acting as an automatic take-up between the panel edges when the door is opened.

8. Vehicle body comprising a body wall including a door section and an adjoining section, a pair of panels slidable upwardly out of the respective sections, said panels having body portions formed of glass and providing juxtaposed transparent edges, hinge means between the sections to define an axis about which the door section swings, said means being arranged so that the axis inclines inwardly into juxtaposition with the plane of the panels at the level of the upper edge of the body wall, the hinge means being disposed below the top of the body wall, the inclined axis being arranged so that it is spaced outwardly of the plane of the lower panels to permit the hinge means to be disposed in a region outwardly of said plane.

9. Vehicle body comprising a body wall including a door and adjoining section, a panel carried by the door, a second panel carried by the adjoining door section, said panels having unframed, transparent edges in direct juxtaposition to form a continuous closure wall, hinge structure connecting the door and adjoining section, said structure defining a hinge axis inclining upwardly and inwardly in relation to the juxtaposed panel edges and intersecting the marginal portion of one of said panels intermediate its height, and resilient means supporting at least one of said panels upon the corresponding body wall section, whereby the panel edges may have a relative wiping movement in relation to each other when the door is swung about the hinge axis.

10. Vehicle body comprising a body wall including a door section and an adjoining section, a pair of panels movable upwardly out of the respective sections into direct juxtaposition to form a continuous closure wall, openings in the adjoining ends of the respective sections through which the ends of the panels may contact, lifting and guiding means for the panels including substantially vertically disposed elements at either side of one of said openings, and a brace extending between said elements and slidable thereon as the panel moves upwardly, hinge means between the panel sections providing an axis in closely spaced relation to the face of the adjoining panel in the region of the top of the body wall.

11. Vehicle body comprising a body wall including a door section and an adjoining section, a pair of panels movable upwardly out of the respective sections into direct juxtaposition to form a continuous closure wall, openings in the adjoining ends of the respective sections through which the ends of the panels may project to permit the contact of the panels, lifting and guiding means for the panels including substantially vertically disposed elements at either side of one of said openings, and a brace extending between said elements and slidable thereon as the panel moves upwardly.

12. Vehicle body comprising a body wall having adjoining sections providing pockets, panels carried by the respective sections and movable upwardly to afford a closure wall above the pockets with the panel edges in direct juxtaposition, lifting and guiding means associated with the respective panels and body wall sections, said means including a pair of upstanding transversely spaced worms, a brace member extending between the worms, an upstanding leaf spring having its lower end connected to the brace member, the upper end of said spring being connected to the lower edge of one of the panels, the spring being effective yieldably to press one of the panels toward the other.

13. Vehicle body comprising a body wall including adjoining wall sections, one of said sections being a door, a pair of panels mounted on the respective sections and having edges in direct juxtaposition to form a closure wall above the body wall, supporting means for one of said panels including an upstanding leaf spring, structure affording an inverted pocket receiving the upper end of the spring and being connected to the lower edge of one of the panels, an element carried by the corresponding wall section and providing a pocket in which the lower end of the spring is received, and cushion elements within both of said pockets yieldably to engage the corresponding end of the spring.

14. Vehicle body comprising a body wall including adjoining wall sections, one of said sections being a door, a pair of panels mounted on the respective sections and having edges in direct juxtaposition to form a closure wall above the body wall, supporting means for one of said panels including an upstanding bar, structure affording an inverted pocket receiving the upper end of the bar and being connected to the lower edge of one of the panels, a pocket provided in the corresponding wall section in which the lower end of the bar is received, and cushion elements within both of said pockets yieldably to grip the corresponding end of the bar, said cushion elements being effective in pressing the edge of one panel yieldably toward the other panel.

15. Vehicle body comprising a body wall including a door section and an adjoining section, said sections being hollow and providing pockets with juxtaposed end walls, panels carried by the respective sections, said panels being movable out of the pockets to have their edges in juxtaposition above the body wall, the end walls of the pockets having openings to facilitate said juxtaposition, lifting and guiding means for said panels including screw-threaded rods in one section at either side of the opening, a transverse brace threaded to engage said rods, a yieldable connector between the brace and corresponding panel, and hinge structure defining an axis about which the door section swings arranged so that the panels engage each other with a wiping contact as the door closes.

16. Vehicle body comprising a body wall including a door section and an adjoining section, a panel slidable out of the door section, and a panel slidable out of the adjoining section, said panels being movable into a position above the body wall wherein they have their edges in direct juxtaposition to form a continuous closure wall, lifting and guiding means associated with said panels and the wall, hinge means between the door and the adjoining section defining an upwardly and inwardly inclined hinge axis, said hinge means including a hinge disposed in the region of the lower edges of the panels when lowered and defining the axis substantially in the region of the outer face of the body wall, and a second hinge disposed between the first hinge and the top of the body wall, said second hinge being concealed within the body wall when the door is in its closed position.

17. Vehicle body comprising a body wall comprising adjoining sections, one of which is a swinging door, hinge means between said sections, panels mounted on the respective sections, said panels having adjoining transparent edges, connecting means between the panels and the respective sections, said connecting means including a yieldable part supporting one panel to permit limited transverse movement of its edge, said hinge means being arranged to cooperate with said connecting means so that said part is stressed when the door is moving to closed position and the panel edges are then held in yieldable wiping engagement for a substantial fraction of the door movement to closed position.

RAYMOND L. CARR.